United States Patent [19]

Kern

[11] 4,454,700
[45] * Jun. 19, 1984

[54] SUSPENDED WOODBEAM CEILING

[76] Inventor: Gilbert G. Kern, 515 N. Victory Blvd., Burbank, Calif. 91502

[*] Notice: The portion of the term of this patent subsequent to Aug. 4, 1998 has been disclaimed.

[21] Appl. No.: 259,858

[22] Filed: May 4, 1981

Related U.S. Application Data

[63] Continuation-in-part of Ser. No. 28,904, Apr. 10, 1979, Pat. No. 4,281,498.

[51] Int. Cl.³ .............................................. E04C 2/42
[52] U.S. Cl. ...................................... 52/665; 52/780; 403/237
[58] Field of Search ................. 52/780, 781, 665, 484; 403/232.1, 237, 346

[56] References Cited

U.S. PATENT DOCUMENTS

| | | | |
|---|---|---|---|
| 2,611,160 | 9/1952 | Hanesse | 403/237 |
| 3,229,387 | 1/1966 | Fischer | 52/781 |
| 3,232,021 | 2/1966 | Wilson | 52/484 |
| 3,690,243 | 9/1972 | Lambert | 52/484 |
| 4,089,146 | 4/1978 | Martinez | 52/484 |
| 4,198,175 | 4/1980 | Knepp | 403/232.1 |
| 4,261,470 | 4/1981 | Dolan | 403/237 |
| 4,281,498 | 4/1981 | Kern | 52/780 |

Primary Examiner—Henry E. Raduazo
Attorney, Agent, or Firm—Bernard P. Drachlis

[57] ABSTRACT

The suspended woodbeam ceiling is formed of a plurality of beams which lie spaced from each other and at right angles from each other to receive drop-in ceiling panels therebetween. Each beam comprises a beam center to which is secured a beam side on each side thereof. Each beam side has a lip which is engaged by the drop-in ceiling panel for the support of the panel. Crossbeams have locking clips formed thereon for engaging on and locking on the main beam. The beam contours and textures provide especially aesthetic appearance.

5 Claims, 3 Drawing Figures

SUSPENDED WOODBEAM CEILING

CROSS-REFERENCE

This application is a continuation-in-part of my earlier patent application Ser. No. 28,904, filed Apr. 10, 1979, entitled "Suspended Woodbeam Ceiling," now U.S. Pat. No. 4,281,498.

BACKGROUND

This invention is directed to a suspended ceiling construction wherein each beam is made of wood or of simulated wood, and more particularly to the metallic clamp which interconnects the beams.

Many commercial buildings have overhead airconditioning, duct work, pipes and electrical wiring. A suspended ceiling is positioned therebelow to provide a ceiling for personnel space. The suspended ceiling is often in the shape of an inverted T-bar which is hung on wires from the overhead. Drop-in ceiling panels lie on the crossbars of the T. This permits ready removal of the panels to execute repairs to the overhead equipment.

Some older homes have high ceilings, and it is desirable to install a suspended ceiling therein. Other older homes have plaster ceilings which require extensive repair. In such cases, a suspended ceiling is desirable. In such installations, a suspended wood beam ceiling is aesthetically attractive.

SUMMARY

In order to aid in the understanding of this invention, it can be stated in essentially summary form that it is directed to a suspended woodbeam ceiling wherein a beam of wood-like appearance is configured to be suspended to interengage and lock with other similar ceiling beams and to receive and support drop-in ceiling panels, and particularly the metallic clips which interengage between the crossbeams and main beams to lock the beams together.

It is thus an object of this invention to provide a suspended woodbeam ceiling construction which is aesthetic so that it can be employed in locations where an attractive suspended woodbeam ceiling is desirable. It is another object of this invention to provide a woodbeam ceiling construction wherein a beam is formed of a center and two sides, each made of wood or simulated wood so that the sides present lips for the support of drop-in ceiling panels. It is another object to provide crossbeams which extend between and engage with suspended main ceiling beams so that the crossbeams lock with and maintain separation of the main beams. It is a further object to provide metal clips on the crossbeams which engage upon the main beam to lock the beams together with sufficient strength to support lamps and drop-in panels.

Other objects and advantages of this invention will become apparent from a study of the following portion of the specification, the claims, and the attached drawings.

DESCRIPTION OF THE PREFERRED EMBODIMENT

Figure 1:
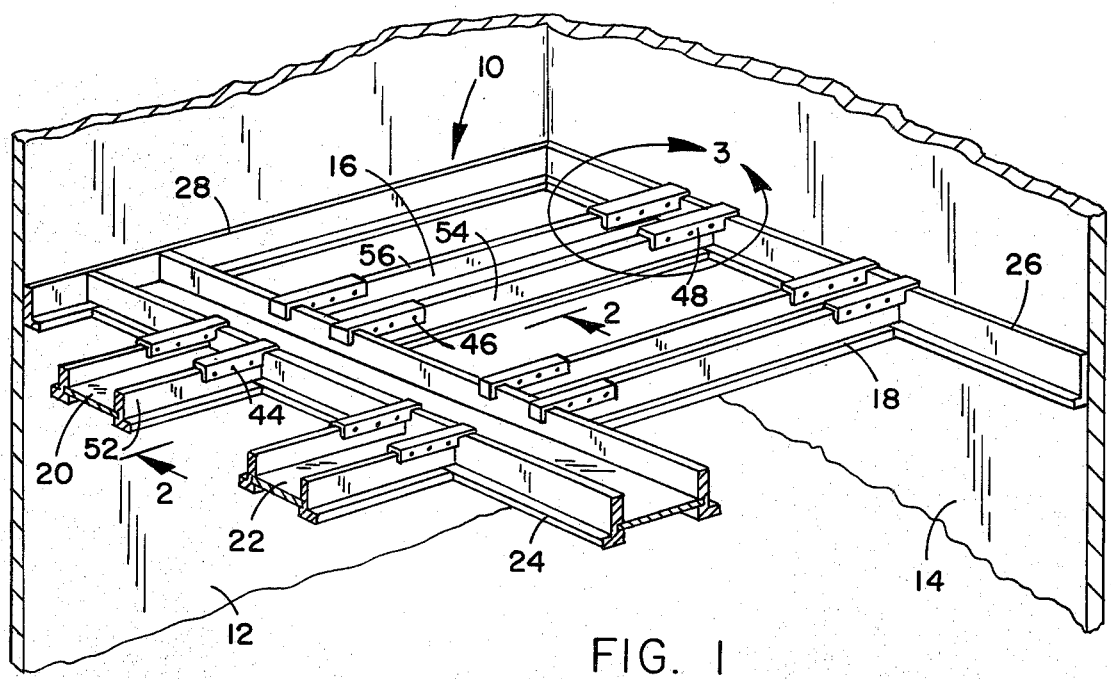
FIG. 1 is an isometric view of a suspended woodbeam ceiling in accordance with this invention, with parts broken away and parts taken in section.

FIG. 1 shows the suspended woodbeam ceiling 10 of this invention as being positioned in a room having walls 12 and 14. The walls intersect at a right angle and enclose a space for personnel below ceiling 10 and a space above the ceiling. The upper space may contain conventional electrical, lighting, and plumbing, as well as heating, cooling, and ventilation equipment. In FIG. 1, the walls of the room are broken away. In the usual room, there are two other walls, and the ceiling 10 extends to those two other walls. Ceiling 10 in FIG. 1 generally comprises a plurality of crossbeams 16, 18, 20, and 22. Crossbeams 20 and 22 are broken away in FIG. 1. FIG. 1 also shows main beam 24 and wall hangers 26 and 28.

Figure 2:
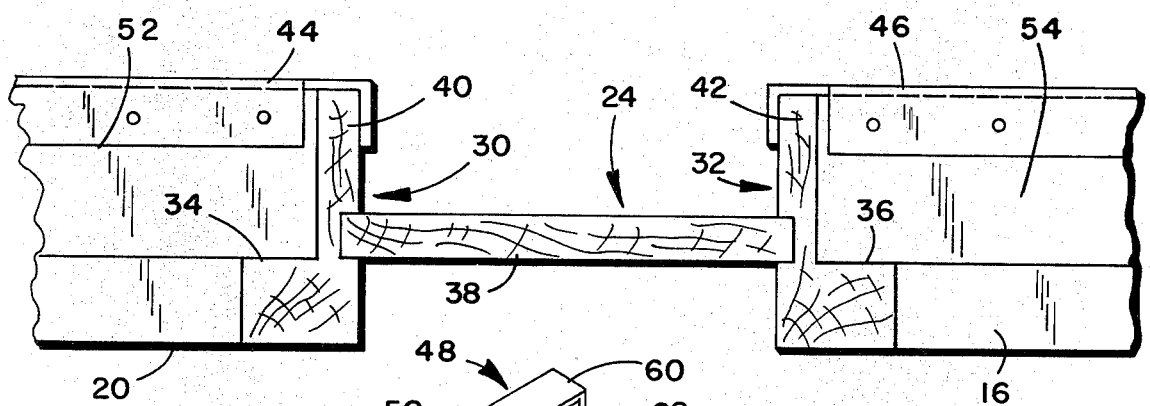
FIG. 2 is an enlarged section taken generally along the line 2-2 of FIG. 1, with parts broken away.

FIG. 2 shows the cross-section of the main beam 24 and the manner in which the metallic fastening clips attach the crossbeams 16 and 20 to the main beam 24.

Figure 3:
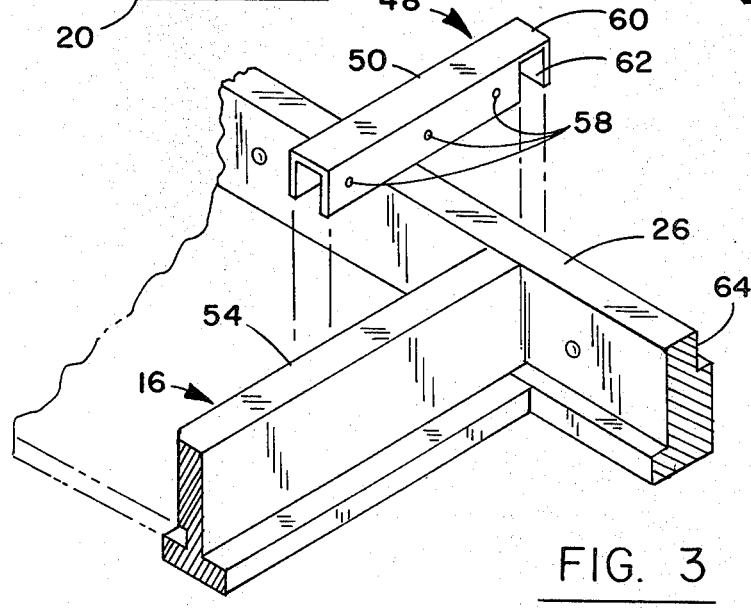
FIG. 3 is an enlarged perspective as seen at the line 3-3 of FIG. 1, with parts broken away.

FIG. 3 schematically shows the attachement of the crossbeam 16 to the wall hanger 26, as an exploded view. The ceiling construction is described in some detail below, but reference is also made to the parent application Ser. No. 28,904 filed Apr. 10, 1979, the entire disclosure of which is incorporated herein by this reference.

As seen in FIG. 2, main beam 24 has beam sides 30 and 32 which are of L-shape configuration. This shape provides lips 34 and 36 on the beam sides which extend away from the center of the beam so that the drop-in ceiling panels can rest thereon. Beam center 38 is secured into the beam sides, as by rabbeting and gluing as indicated. Preferably, the bottom of the beam center 38 is in the same plane as the lips 36 and 38, for appearance purposes, but other configurations are feasible. The upstanding webs 40 and 42 respectively of beam sides 30 and 32 provide beam strength to the structure and provide an attachment point for the crossbeams. The structure comprised of beam sides 30 and 32, together with beam center 38, is permanently assembled and is considered a main beam. As seen in FIG. 1, main beam 24 extends the entire distance along the length of the room, from one wall to the other, except for the short length provided by the thickness of the opposing wall hangers. Main beam 24 is supported from the overhead by means of wires engaged with respect to the main beam, such as through screw-eyes screwed down into the top center of beam center 38. Since the wood beam ceiling of the present invention has much greater strength than the standard T-bar suspended ceiling, the number of suspension wires necessary for the installation of the wood beam ceiling is greatly reduced.

In the preferred embodiment, each of the main beams, crossbeams and wall hangers is preferably made of wood; and in such a case, the three elements of the main beam are glued together and may have additional fastening means. In an alternative embodiment, the main beam may be extruded of thermoplastic, synthetic polymer composition material, and, in such a case, it is preferably configured and colored to resemble wood.

Crossbeams 16 and 20, as well as other crossbeams and main beams, have the same cross-section as main beam 24. As is seen in FIG. 2, the ends of the crossbeams 16 and 20 are cut back so that the web of the beam sides lies respectively against webs 42 and 40 and on top of lips 36 and 34. This provides vertical support for the crossbeams, which are usually shorter in length than the main beam. Depending on the width of room 10, more than one main beam may be used, and thus more than two lengths of crossbeams may be needed to span the width of the room. In order to provide better support and locking of the crossbeams, the locking clips of this invention are provided. Locking clips 44 and 46 are illustrated in FIGS. 1 and 2 as being engaged on the upstanding webs of crossbeams 20 and 16 and respectively engaging over the webs 40 and 42 of the main beam. All of the locking clips are the same, and locking clip 48 in FIG. 3 is shown in isometric view. Locking clip 48 has a clamp body 50 which is of inverted U-shape configuration sized to fit over the upstanding webs, of which webs 40 and 42 are an example. Furthermore, webs 52 and 54 are identified in FIGS. 1 and 2 for the carrying thereon of locking clips 44 and 46, and web 56 is shown in FIG. 3 for carrying thereon of locking clip 48. The body of the locking clip engages over the web, and is secured thereto. As illustrated in these Figures, the locking clips are made of metal, preferably malleable sheet metal stamped or shaped into form. Inwardly extending dimples are formed in the sides of the U-shaped clamp body, with dimples 58 illustrated in FIG. 3. Theses dimples engage into the upstanding wooden web structure to lock the clamp body in place. The outer end of the clamp body has hook finger 60 thereon which has a space 62 between the clamp body and the hook finger. The space 62 is sufficient to receive the web to which the locking clip is hooked, and hook finger 60 extends beyond the web of the main beam to hook thereon. In this way, locking is achieved.

As indicated in FIG. 3, the wall hanger or wall molding 26 may have a recess 64 on the wall side thereof to receive hook finger 60.

In placing the suspended woodbeam ceiling in a room, the wall hangers are first put in place with the lips thereon in a single horizontal plane at the desired height. Thereupon, the main beams are placed with tension support from the overhead, if required. Wires from the overhead through screweyes attached in the top of the beam center provide adjustable support. In this way, the ceiling panel support lips lie in a single plane. As the main beams are placed, crossbeams are placed to properly laterally locate the main beams. The lower faces of all the beams also lie in a plane. Drop-in ceiling panels are dropped into the openings defined by the wall hangers, crossbeams and main beams. In each case, the lips are in the same plane so that the drop-in ceiling panel rests thereon and defines the ceiling closure. In such cases, the ceiling panels may be translucent, so that a light above the suspended woodbeam ceiling shines therethrough. In this way, a decorative and strong suspended woodbeam ceiling is achieved with the opportunity that it may be fit into a room of any convenient and appropriate size.

Drop in ceiling panels come in standard dimensions, the most common of which is 2 feet by 4 feet. With these standard dimensions, the beams and crossbeams of the present invention can be mass-produced in standard lengths to reduce the cost of production. When it is necessary to have a nonstandard length due to the room size, the standard beams and crossbeams can be easily cut to the proper dimension. When a standard-length beam or crossbeam is cut to fit the room, a locking clip can be easily attached to the top of the cut end of the beam or crossbeam to provide the necessary supporting structure.

As an example of particular dimensions which provide an excellent-appearing beam for a suspended woodbeam ceiling, the beam center 42 can be 2¾ inches from side to side, and rabbeted into the beam sides for a depth of ⅛ inch. When the upstanding webs, for example web 40, is ¼ inch thick and lip 34 is ⅛ inch wide, then the lower face of the beam side can be ¾ inch across. The thickness from the lower face of the lip can be ½ inch, with the upstanding flange 1⅛ inch high. These dimensions provide a beam structure which can be economically cut from available stock sizes and can provide a beam structure which is of generous proportions for such use, but is not too bulky for decorative balance.

This invention has been described in its presently contemplated best mode and it is clear that it is acceptable to numerous modifications, modes, and embodiments within the ability of those skilled in the art and without the exercise of the inventive faculty. Accordingly, the scope of this invention is defined by the scope of the following claims.

What is claimed is:

1. A beam for a suspended beam ceiling structure, said beam comprising:

two upwardly extending wood webs lying parallel to each other and each having a substantially flat top and an outwardly extending and upwardly facing lip on one side of each said wood web so that said lips face away from each other, the end of said beam being configured to transversely engage against another of said beams with said webs longitudinally extending past said lips;

a metal locking clip having a body of rectangular inverted U-shaped flat-top configuration engaged over each said web and, said locking clips having dimples formed in the body thereof, said dimples being engaged in said wood webs to restrain said locking clips on said wood webs, said locking clips each having a hook finger thereon extending past the end of its web, said hook finger being dimensioned to engage over the flat topped web of an adjacent beam to which said beam is to be engaged.

2. A suspended beam ceiling structure having at least two beams, one of said beams being a main beam and the other of said beams being a crossbeam, each of said beams having first and second beam sides, each of said beam sides being L-shaped with an upwardly extending web, and each of said beam sides having an upwardly facing lip adjacent said web and having a downwardly directed face, said faces of said beam sides of each of said beams lying in a plane;

a beam center between said beam sides and attached to said beam sides and maintaining said beam sides in a spaced relationship, said beam center and said beam sides each being made of wood and said beam center being attached to both said beam sides, said crossbeam being configured for end-wise joining against the side of said main beam with said plane of said faces of said crossbeam lying substantially in the plane of said faces of said main beam, and with said beam sides of said crossbeam substantially abutting one of said beam sides of said main beam;

locking means attached to said crossbeam, said locking means comprising a locking clip engaged upon said web of at least one of said beam sides, said locking clip having a hook finger thereon engaging over and around said upstanding web on said beam side of said main beam against which said beam side of said crossbeam abut.

3. The suspended beam ceiling structure of claim 2 wherein said locking clip has an inverted U-shaped body engaging over said upstanding web of said beam side of said crossbeam for securing said locking clip in place on said crossbeam.

4. The suspended beam ceiling structure of claim 3 wherein said locking slip is formed of malleable metal and has dimples impressed therein to engage in said upstanding wooden web of said crossbeam.

5. The suspended beam ceiling structure of claim 4 wherein said locking clip has an extended metallic hook finger which extends past said body to engage above and beyond said upstanding flange of said main beam to lock said crossbeam against said main beam.

* * * * *